(12) United States Patent
Chen et al.

(10) Patent No.: US 11,285,709 B1
(45) Date of Patent: Mar. 29, 2022

(54) PACKAGING FOR PREFINISHED ARTICLES

(71) Applicant: James Hardie Technology Limited, Dublin (IE)

(72) Inventors: Yongjun Chen, Rancho Cucamonga, CA (US); Caidian Luo, Alta Loma, CA (US); Jimmy Lee McCammon, Arlington, TX (US)

(73) Assignee: James Hardie Technology Limited, Dublin (IE)

( * ) Notice: Subject to any disclaimer, the term of this patent is extended or adjusted under 35 U.S.C. 154(b) by 146 days.

(21) Appl. No.: 16/875,096

(22) Filed: May 15, 2020

Related U.S. Application Data

(63) Continuation-in-part of application No. 15/713,514, filed on Sep. 22, 2017, now Pat. No. 10,920,111.

(60) Provisional application No. 62/399,258, filed on Sep. 23, 2016, provisional application No. 62/478,547, filed on Mar. 29, 2017.

(51) Int. Cl.
| | |
|---|---|
| *B32B 7/02* | (2019.01) |
| *B32B 27/32* | (2006.01) |
| *B32B 7/12* | (2006.01) |
| *B32B 27/18* | (2006.01) |
| *C09J 133/02* | (2006.01) |
| *C09J 131/04* | (2006.01) |
| *C09J 11/06* | (2006.01) |

(52) U.S. Cl.
CPC ............... *B32B 27/32* (2013.01); *B32B 7/12* (2013.01); *B32B 27/18* (2013.01); *C09J 11/06* (2013.01); *C09J 131/04* (2013.01); *C09J 133/02* (2013.01); *B32B 2264/104* (2013.01); *B32B 2439/00* (2013.01)

(58) Field of Classification Search
CPC ............................. B32B 27/32; B32B 27/327
See application file for complete search history.

(56) References Cited

U.S. PATENT DOCUMENTS

| | | | |
|---|---|---|---|
| 2002/0195191 A1 | 12/2002 | Weiss et al. | |
| 2004/0180195 A1* | 9/2004 | Macuga | ..................... B32B 7/06 428/343 |
| 2007/0004854 A1 | 1/2007 | Wu et al. | |
| 2009/0130157 A1* | 5/2009 | Ylitalo | ................... B32B 27/308 424/405 |
| 2010/0297438 A1 | 11/2010 | Ross et al. | |
| 2011/0236693 A1 | 9/2011 | Killilea et al. | |

* cited by examiner

*Primary Examiner* — Zachary M Davis
(74) *Attorney, Agent, or Firm* — Knobbe, Martens, Olson & Bear, LLP

(57) ABSTRACT

Disclosed herein are various embodiments of a protective packaging system suitable for use with a prefinished building article. The protective packaging system generally is designed to reduce shrink back of the flexible substrate after tension is applied. The protective packaging system generally comprises at least one outer layer, at least one core layer and at least one adhesive layer. One or more layers of the protective packaging system may include a roughening agent such that the flexible substrate will not "gloss" or burnish a coating on a prefinished building article. The protective packaging system may also include one or more biocides.

20 Claims, 3 Drawing Sheets

PACKAGING FOR PREFINISHED ARTICLES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

Embodiments of the present disclosure relate generally to packaging for building materials, and more particularly, to packaging for prefinished building materials such as fiber cement articles.

Description of the Related Art

Often building materials, such as fiber cement articles, are prefinished prior to leaving the factory whereby one or more coating layers, for example, a primer layer or a primer layer together with one or more paint layers, are applied to at least one surface to form the prefinished building material or article.

Traditionally protective packaging systems, such as flexible films, have been used to provide temporary protection of the surface coatings on the prefinished article during stacking, storage, shipping and field application. The protective packaging systems are typically placed on the prefinished article using a heated roll laminator which applies tension and heat to the flexible film to stretch the film to cover the entire surface of the prefinished article. It is sometimes difficult to ensure that the protective packaging system remains in place and fully covers the surface of the prefinished article, while at the same time is easily removable without damaging the coated surface. Overstretching of the film during lamination can cause the film to shrink back immediately after lamination and leave areas of the prefinished article uncovered.

In addition, it has been found that the finish or coating on a prefinished article protected by the protective packaging system can exhibit an increased level of gloss in areas of high pressure loading. The increased level of gloss can cause the prefinished article to have a non-uniform appearance with certain areas of the coating finish appearing shinier relative to other areas.

SUMMARY OF THE INVENTION

Disclosed herein are various embodiments of a protective packaging system suitable for use with a prefinished building article, such as prefinished fiber cement siding. The protective packaging system comprises a multilayer film which generally includes a flexible substrate and an adhesive layer disposed thereon. Certain embodiments of the system are designed to reduce stress in the flexible substrate induced by stretching from the application process when tension is applied to the system. Certain embodiments of the system are designed to reduce the level of gloss imparted by the flexible substrate on the prefinished article in areas of high pressure loading. In various embodiments, the protective packaging system may be a multilayer film, generally comprising at least one outer layer, at least one core layer and at least one adhesive layer. In various embodiments, the protective packaging system may further include one or more biocides to provide enhanced mold resistance to the prefinished article.

In one embodiment, a protective packaging system for providing temporary protection of a top coating on a prefinished building article is provided. The system includes an outer layer comprising 25% to 40% by weight of a low density polyethylene (LDPE) and 60% to 75% by weight of a high density polyethylene (HDPE), wherein the LDPE and the high density polyethylene are present in the outer layer in a mass ratio of about 1:3 to about 3:1. In an alternate embodiment, the system includes an outer layer comprising 50% to 90% by weight of a low density polyethylene (LDPE) and 10% to 50% by weight of a high density polyethylene (HDPE), wherein the LDPE and the HDPE are present in the outer layer in a mass ratio of about 1:1 to about 9:1. The system further comprises an adhesive layer, wherein the adhesive layer comprises ethylene methacrylate, acid modified ethylene acrylate terpolymer, an ethylene acrylic acid comprising 15-40% acid co-monomer, and a roughening agent, wherein the roughening agent comprises inorganic particulates dispersed in a polyethylene resin mixture in a manner such that at least some of the inorganic particulates protrude from the adhesive layer. The system also includes a core layer disposed between the outer layer and the adhesive layer, wherein the core layer comprises a linear low density polyethylene, a low density polyethylene, and the roughening agent. Optionally, the protective packaging system also includes at least one biocide. In one implementation, the at least one biocide is in the form of Zinc Pyrithione or Silver Phosphate or a combination of both Zinc Pyrithione and Silver Phosphate, wherein the ratio of Zinc Pyrithione to Silver Phosphate is in the range of 1:3 to 3:1.

In one embodiment, a further protective packaging system for providing temporary protection of a top coating on a prefinished building article is provided. The system includes an outer layer comprising 50% to 90% by weight of a low density polyethylene (LDPE) and 10% to 50% by weight of a high density polyethylene (HDPE), wherein the LDPE and the HDPE are present in the outer layer in a mass ratio of about 1:1 to about 9:1. The system further comprises an adhesive layer, wherein the adhesive layer comprises ethylene methacrylate copolymer, ethylene acrylic acid copolymer, Maleic anhydride (MAH)—ethylene vinyl acetate (EVA) and at least one biocide. The system also includes a core layer disposed between the outer layer and the adhesive layer, wherein the core layer comprises a linear low density polyethylene and a low density polyethylene. In one implementation, the at least one biocide is in the form of Zinc Pyrithione or Silver Phosphate or a combination of both Zinc Pyrithione and Silver Phosphate, wherein the ratio of Zinc Pyrithione to Silver Phosphate is in the range of 1:3 to 3:1.

In additional implementations, the protective packaging system is a multilayer film comprising an outer layer, a core layer and an adhesive layer, wherein each layer has a selected composition. In one embodiment, the at least one outer layer comprises a low density polyethylene (LDPE) and a second polymer selected to resist shrink back following stretching. The second polymer can comprise a polypropylene (PP) or a high density polyethylene. In some implementations, the at least one outer layer comprises a low density polyethylene (LDPE) and a polypropylene (PP), wherein the ratio of LDPE to PP is within the range of about 1:3 to about 3:1. In a further implementation, the at least one outer layer comprises a low density polyethylene, a high density polyethylene and optionally a polypropylene (PP), wherein the ratio of low density polyethylene to high density polyethylene is within the range of about 1:3 to about 3:1. In an additional embodiment, the at least one core layer can also comprise a polymer selected to resist shrink back following stretching. In one embodiment the polymer selected to resist shrink back following stretching can be in the form of polypropylene (PP). In some implementations, the at least one core layer comprises a linear low density polyethylene (LLDPE) and a polypropylene (PP), wherein the ratio of LDPE to PP is within the range of about 1:3 to about 3:1.

Generally, the at least one core layer comprises a low density polyethylene. The at least one core layer may also comprise at least two low density polyethylene polymers wherein the at least two low density polyethylene polymers comprise a low density polyethylene and a linear low density polyethylene. In a further embodiment, the at least one core layer further comprises polypropylene. In one embodiment, the at least one core layer comprises a low density polyethylene and a polypropylene, wherein the low density polyethylene comprises a linear low density polyethylene and/or a low density polyethylene. In another implementation, the at least one core layer further comprises a roughening agent. The roughening agent may be in the form of an inorganic particulate dispersed in the core layer. In one embodiment the inorganic particulate is calcium carbonate ($CaCO_3$). The calcium carbonate may be provided as a 70% by weight calcium carbonate ($CaCO_3$) in polyethylene resin mixture. In a particular example, the at least one core layer comprises approximately 60% by weight low density polyethylene, approximately 20% by weight linear low density polyethylene and approximately 20% by weight of the roughening agent, wherein the roughening agent comprises a 70% by weight calcium carbonate ($CaCO_3$) in polyethylene resin mixture.

In one embodiment, the at least one adhesive layer comprises one or more polymers. The polymers of the at least one adhesive layer may be selected from an ethylene methacrylate, an acrylic acid, an acid modified acrylate such as an acid modified ethylene acrylate terpolymer, thermoplastic acrylates and a maleic anhydride (MAH) modified ethylene-vinyl acetate copolymer (EVA) (MAH-EVA), wherein the or each polymer can be characterized by a selected Vicat softening point and/or a selected melt flow rate (MFR). In one embodiment, the Vicat softening point of the adhesive layer is preferably approximately 104 F (40° C.) to 120 F (48.9° C.). Optionally, in a further embodiment, the at least one adhesive layer further comprises a roughening agent. Optionally, in an alternate embodiment, the at least one adhesive layer further comprises a roughening agent and/or at least one biocide. Advantageously, in one embodiment, the roughening agent is in the form of an inorganic particulate. The inorganic particulate may be calcium carbonate ($CaCO_3$). In a further embodiment, the calcium carbonate is 70% by weight calcium carbonate ($CaCO_3$) in polyethylene resin mixture. Advantageously, the at least one biocide is in the form of Zinc Pyrithione or Silver Phosphate or a combination of both Zinc Pyrithione and Silver Phosphate, wherein the ratio of Zinc Pyrithione to Silver Phosphate is in the range of 1:3 to 3:1.

One advantage of the protective packaging system is that the protective packaging system adapts to the surface morphology of the prefinished article thereby protecting the prefinished article from damage during stacking, storage, transport and/or during handling of said prefinished articles in the field.

The prefinished article may comprise a prefinished fiber cement article wherein the fiber cement article is coated with one or more coating layers applied to at least one surface of the fiber cement article to form the prefinished article. In one embodiment, for example, the one or more coating layers comprises one or more of a sealer layer, a primer layer or one or more paint layers, or combinations thereof. Optionally, one or more of the coating layers comprises one or more biocides within the sealer layer, primer layer or paint layer.

Accordingly, disclosed herein in another embodiment is a protected prefinished fiber cement article comprising a prefinished fiber cement article and a protective packaging system comprising an outer layer, a core layer and an adhesive layer.

In one implementation, a coated fiber cement building article having a surface in contact with a multilayer film is provided, wherein the multilayer film includes an outer layer, a core layer, and an adhesive layer. The outer layer may comprise a mixture of a low density polyethylene (LDPE) and a high density polyethylene. The adhesive layer may be disposed on the surface of the fiber cement article. In one embodiment the adhesive layer comprises an ethylene acrylic acid comprising 15-40% acid co-monomer, and a roughening agent, wherein the roughening agent can be formed of inorganic particulates in which at least some of the inorganic particulates protrude from the adhesive layer. In an alternate embodiment, the adhesive layer comprises ethylene methacrylate copolymer, ethylene acrylic acid copolymer, Maleic anhydride (MAH)—ethylene vinyl acetate (EVA) and at least one biocide, wherein the at least one biocide is in the form of Zinc Pyrithione or Silver Phosphate or a combination of both Zinc Pyrithione and Silver Phosphate, wherein the ratio of Zinc Pyrithione to Silver Phosphate is in the range of 1:3 to 3:1. The core layer may be disposed between the outer layer and the adhesive layer, and may comprise a low density polyethylene and the roughening agent.

Also disclosed herein is a method of applying a protective packaging system to a prefinished fiber cement article comprising the steps of:
  a) obtaining a prefinished article or product;
  b) obtaining a protective packaging multilayer film;
  c) applying a protective packaging multilayer film to prefinished product; and
  d) stacking the protected prefinished product.

In one implementation, a method of protecting a prefinished article is provided, comprising the steps of: a) obtaining a prefinished article; b) obtaining a protective packaging multilayer film comprising an outer layer, a core layer, and an adhesive layer; c) applying the protective packaging multilayer film to a surface of the prefinished article to make a protected prefinished article; and d) stacking the protected prefinished article. The outer lay of the protective packaging multilayer film may comprise a low density polyethylene (LDPE) and a high density polyethylene. The core layer may comprise a low density polyethylene, a linear low density polyethylene (LLDPE), and a roughening agent comprising an inorganic particulate. The adhesive layer may comprise an ethylene methacrylate, an ethylene acrylic acid comprising 15-40% acid co-monomer, and the roughening agent.

The foregoing summary is illustrative only and is not intended to be in any way limiting. In addition to the illustrative aspects, embodiments and features described above, further aspects, embodiments and features will become apparent by reference to the drawings and following detailed description.

DETAILED DESCRIPTION OF THE PREFERRED EMBODIMENT

Figure 1:
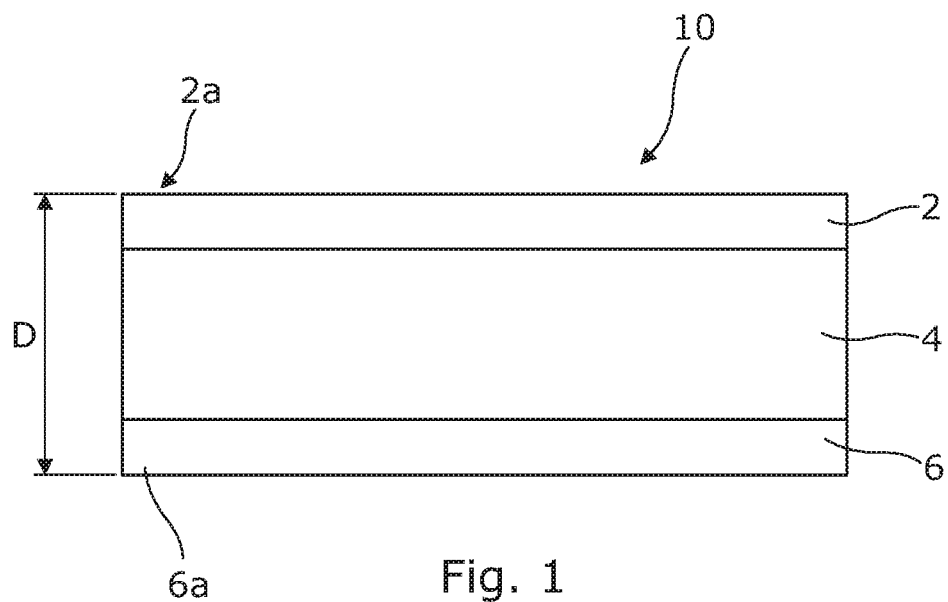
FIG. 1 is a cross-sectional side view of a representative segment of the protective packaging system according to one embodiment.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be used, and other changes may be made, without departing from the spirit or scope of the subject matter presented here. The embodiments of the present disclosure, as generally described herein, and illustrated in the figures, can be arranged, substituted, combined, and designed in a wide variety of different configurations, all of which are explicitly contemplated and made part of this disclosure.

The present disclosure generally describes improved protective packaging systems for prefinished building articles, and particularly for coated fiber cement (FC) articles. The protective packaging system generally includes at least one supporting layer and an adhesive layer disposed thereon. The compositions and configurations of the layers of the protective packaging system are selected to reduce stretching and resist shrink back before and after application of tension and to reduce the level of gloss imparted by the protective packaging system onto the prefinished FC article in areas of high pressure loading. In some embodiments, the protective packaging system also provides tearing resistance while maintaining the surface texture of a prefinished article upon which it is applied. In further embodiments, the protective packaging system provides enhanced mold resistance.

The protective packaging system can advantageously be in the form of a flexible multilayer film configured to provide more complete film coverage and stronger temporary bonding to a coated surface of a prefinished article. In some embodiments, the protective packaging system comprises at least one outer layer, at least one core layer and at least one adhesive layer. The at least one outer layer, at least one core layer, and at least one adhesive layer are selected and combined to achieve one or more of the characteristics described herein.

In one embodiment, the at least one outer layer comprises a low density polyethylene (LDPE), wherein the LDPE can be a linear low density polyethylene (LLDPE), and a second polymer selected from a high density polyethylene (HDPE) or a polypropylene (PP); the at least one core layer comprises a low density polyethylene and a linear low density polyethylene, optionally a high density polyethylene, and optionally a roughening agent; and the at least one adhesive layer comprises ethylene acrylic acid (EAA) copolymer, ethylene methacrylate (EMA) copolymer, acid modified ethylene acrylate terpolymer, optionally polyethylene resin mixture comprising a roughening agent, and optionally maleic anhydride modified ethylene-vinyl acetate copolymer (MAH-EVA). Each polymer described herein can be characterized by a selected Vicat softening point and/or a selected melt flow rate (MFR).

In one embodiment, the at least one outer layer comprises a low density polyethylene (LDPE), wherein the LDPE can be a linear low density polyethylene (LLDPE), and a second polymer selected from a high density polyethylene (HDPE), a polypropylene (PP) or a combination of both a high density polyethylene (HDPE) and a polypropylene (PP), the at least one core layer comprises a low density polyethylene and a linear low density polyethylene, optionally a high density polyethylene, and optionally a roughening agent; and the at least one adhesive layer comprises ethylene methacrylate copolymer, ethylene acrylic acid copolymer, Maleic anhydride (MAH)—ethylene vinyl acetate (EVA), at least one biocide, wherein the at least one biocide is in the form of Zinc Pyrithione or Silver Phosphate or a combination of both Zinc Pyrithione and Silver Phosphate, wherein the ratio of Zinc Pyrithione to Silver Phosphate is in the range of 1:3 to 3:1 and optionally a roughening agent. Each polymer described herein can be characterized by a selected Vicat softening point and/or a selected melt flow rate (MFR).

The multilayer film will advantageously limit damage to a coated substrate under a wide variety of conditions. Thus, the multilayer film will advantageously resist shrink back while maintaining sufficient flexibility to conform to the surface of the prefinished article to which it is applied. In some instances, when the protected prefinished articles have been stacked together, areas of the protective packaging system and the prefinished articles experience pressure loading up to approximately 1000 psi. Thus, the multilayer film may be configured to withstand handling under high pressure without tearing or wear-through. Further the multilayer film will advantageously provide enhanced mold resistance when protecting prefinished article particularly in warm humid situations where moisture is trapped between the multilayer film and the prefinished article.

The outer or backer layer of the multilayer film plays a role in providing strength to the film. Lamination of a protective packaging system may involve stretching and/or rolling at high temperatures. Thus, the outer layer may be chosen to resist stretching during a high temperature lamination process. Additionally, the outer layer may provide tear resistance, which is particularly important in a film incorporating a particulate.

The multilayer film may advantageously be sufficiently ductile or malleable to adapt to the surface morphology of the prefinished article to which it is applied. By conforming to the surface morphology of the prefinished article the protective packaging system exhibits resistance to shrink back after application, and maintains good adhesion to the prefinished article over time.

It is noted that adapting to the surface morphology of the prefinished article is particularly advantageous when the protective packaging system is applied to a patterned prefinished article, such as, for example, a fiber cement building article having a wood grain relief pattern on the prefinished surface. In such an example, a wood grain relief pattern on the prefinished surface generally comprises a series of peaks, valleys and flattened areas. Thus, the protective packaging system may be configured for application to a fiber cement building article having a wood grain relief pattern on at least one coated surface. The surface morphology may be characterized by texture, for example microtexture, such that the surface appears satin or matte. In further embodiments, the protective packaging system maintains a satin or matte surface appearance of the prefinished article.

The protective packaging system according to certain embodiments of the present disclosure will not deform the surface texture of a coating on an underlying substrate, and specifically will not "gloss" or burnish a coating on a fiber cement article, even in areas of high pressure loading. In an embodiment, the protective packaging system includes a roughening agent in one or more layers. A roughening agent may be selected to provide an inflexible structure within the protective packaging system. The roughening agent may be a particulate embedded and/or encased in one or more layers of the protective packaging system. A protective packaging system including a roughening agent may advantageously limit or prevent smoothing and glossing of the surface of a coating, for example, a polymer-based coating, on the prefinished article. In some embodiments, the protective packaging system limits or prevents glossing of the surface of a coated article.

The protective packaging system according to certain embodiments of the present disclosure may alternatively or further provide enhanced resistance to mold thereby helping to reduce or prevent the formation of mold on fiber cement or alternatively to the coating layers applied to the fiber cement underlying substrate. In one embodiment, the protective packaging system includes a biocide in one or more layers of the protective packaging system. In one embodiment, the protective packaging system includes a biocide in the adhesive layer of the protective packaging system. In use, the adhesive layer of the protective packing system is located adjacent to either the fiber cement substrate or alternatively the coating layer surfaces when the coating layer surfaces are on the fiber cement substrate. The biocide may be selected to provide resistance to mold growth on fiber cement and/or on coating layer surfaces when the coating layer surfaces are applied to a fiber cement substrate.

Finally, a protective packaging system may be exposed to extremes of temperature during manufacturing, transport, or in the field. Thus, a multilayer film may be configured for use in temperature conditions between −20 F and 150 F.

Surprisingly, some embodiments of a protective packaging system generally comprised of an outer layer, a core layer and an adhesive layer as provided herein has been found to meet one or more of the aforementioned objectives.

In the context of the following description a protective packaging system may be a slip sheet. A slip sheet or protective packaging system generally will comprise a multilayer film as provided herein.

Figure 2:
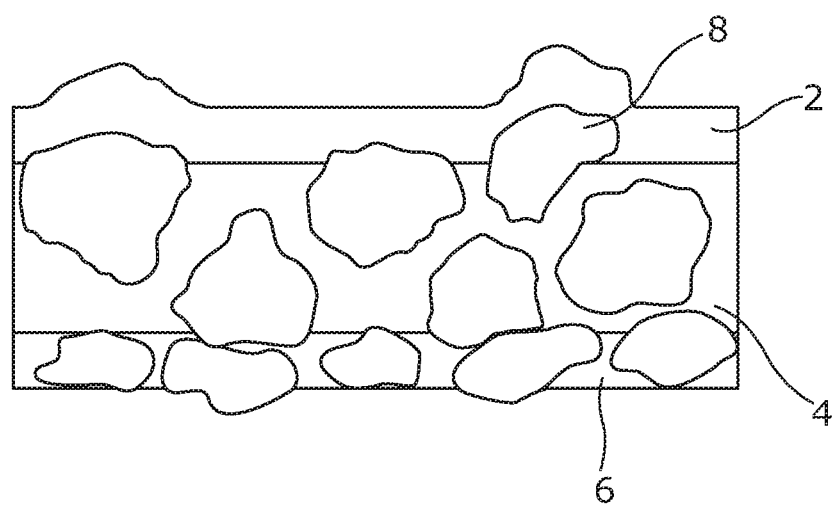
FIG. 2 is an enlarged cross-sectional side view of an exemplary section of the protective packaging system of FIG. 1.

Referring initially to FIGS. 1 and 2, there is illustrated one embodiment of the protective packaging system suitable for protecting the finish of a prefinished article. In one embodiment, the protective packaging system comprises a multilayer film 10 comprising an outer layer 2, a core layer 4 and an adhesive layer 6. Each of the outer layer 2, core layer 4 and adhesive layer 6 will be described in detail below.

Each of the outer layer 2, core layer 4 and adhesive layer 6 provide functionality which combine synergistically to the overall functionality of multilayer film 10.

In an embodiment, outer layer 2 provides strength and tear resistance to multilayer film 10. Having a relatively strong outer layer 2 increases the resistance of multilayer film 10 to elevated temperatures and pressures, and reduces the amount of shrink back experienced by multilayer film 10 after multilayer film 10 is applied to a prefinished article using a lamination process. Thus, outer layer 2 advantageously exhibits little deformation under a tensile force, even at elevated temperatures. In addition the strength of the outer layer 2 provides tearing resistance for the prefinished packaging system. Optionally, core layer 2 can also be configured to provide strength and tear resistance to multilayer film 10.

Turning now to core layer 4. In an embodiment, core layer 4 provides support to each of the outer layer 2 and the adhesive layer 6. The composition of core layer 4 is sufficiently strong to support the outer layer 2 whilst also being sufficiently malleable or ductile to enable the layer to be shapeable when under pressure, for example, a loading pressure. Conveniently the shapeability of the core layer 4 also enables the core layer 4 (in conjunction with the adhesive layer 6) to adapt to the surface morphology of the prefinished article when the protective packaging system is in situ on the prefinished article. The core layer 4 may also provide cohesiveness to the multilayer film by adhering to outer layer 2 and adhesive layer 6.

A protective packaging system provided herein may include a roughening agent. A roughening agent, when included in one or more layers of a slip sheet, can prevent or reduce glossing of the surface texture of a prefinished article. Thus, core layer 4 advantageously may be selected to act as a carrier for a roughening agent. In a preferred embodiment, core layer 4 includes a roughening agent. Adhesive layer 6 may also carry a roughening agent. The roughening agent in each of core layer 4 and adhesive layer 6 may be the same or different.

A further protective packaging system provided herein may include a biocide. A biocide may be included in the protective packaging system either independently or in addition to the roughening agent. The biocide, when included is incorporated into the adhesive layer 6 of the multilayer film 10. The biocide, when included provides enhanced mold resistance.

In an embodiment, the adhesive layer 6 provides temporary bonding between multilayer film 10 and the prefinished article such that the multilayer film 10 adheres to, yet is also easily removed from, the prefinished article when appropriate. Thus, adhesive layer 6 will advantageously provide temporary adhesion to, and removal from, a coated surface under a variety of surface energies and temperature conditions. It is preferable for the adhesive layer 6 to achieve a bonding strength within the range of 10 to 100 g/inch, or preferably at about 30 to 70 g/inch, or more preferably about 30 g/inch. An advantage of having a bonding strength within this range is that, in use, it is possible to achieve good adhesion and coverage when placing the multilayer film 10 on the prefinished article whilst also enabling easy removal of the multilayer film 10 in the field under all weather conditions without damaging the prefinished, for example coated, surface of the prefinished article. In an embodiment, the adhesive layer 6 includes a roughening agent. In a further embodiment, the adhesive layer 6 includes a biocide. In yet another embodiment, the adhesive layer 6 includes both a roughening agent and a biocide.

Advantageously, the composition of the adhesive layer is chosen such that the adhesive layer adheres to a prefinished article during application of the protective packaging system, and during handling, storage and transport, thereby holding the protective packaging system in place; and leaves no undesirable residue from the adhesive upon removal of the protective packaging system from the prefinished article. Further, the composition of the adhesive layer is advantageously chosen such that a coating on the protected surface of the prefinished article is not damaged during removal of the protective packaging system. For example, in certain embodiments, a sealing agent, primer, paint, or combination of two or more of these, will not be warped, torn or stripped when the protective packaging system is removed from the prefinished article.

Referring now to FIG. 2, there is shown an enlarged cross-sectional side view of an exemplary section of the protective packaging system of FIG. 1, clearly showing the presence of a roughening agent 8 in both the at least one core layer 4 and the at least one adhesive layer 6. As seen in FIG. 2, the roughening agent can be a particulate, and preferably an inorganic particulate. The size and shape of the inorganic particulate are selected together with the composition and thickness of core layer 4, adhesive layer 6, and multilayer film 10. Generally, and as depicted in FIG. 2, the roughening agent is chosen so that external surface 6a of adhesive layer 6, and/or external surface 2a of outer layer 2, at least partially take the shape of the inorganic particulate. In an embodiment, an inorganic particulate can project through, or protrude from, external surface 6a of adhesive layer 6 and/or external surface 2a of outer layer 2.

In an embodiment, the external surface 6a of the at least one adhesive layer 6 is remote from the core layer 4 and sits adjacent to the prefinished surface of the prefinished article when the multilayer film 10 is in use. In a further embodiment, the external surface 2a of the at least one outer layer 2 is remote from the core layer 4 and remote from the prefinished surface of the prefinished article when the multilayer film 10 is in use. In one embodiment, external surface 6a of adhesive layer 6 makes contact with the prefinished surface of the prefinished article upon application of the multilayer film 10 to the prefinished article.

In FIG. 2, the inorganic particulate is in the form of irregularly shaped particles of $CaCO_3$ having an average longest dimension, for example, diameter, of 15 to 30 μm. In a preferred embodiment, the average thickness of the at least one core layer is approximately 30 μm. Thus, in the embodiment of FIG. 2, the size and volume of inorganic particulate 8 in the at least one core layer 4 is such that the inorganic particulate 8 is forced to protrude from the at least one core layer 4 into the adjacent layers 2 and 6.

An advantage of the inorganic particulate 8 is that it creates a degree of surface roughness that helps to prevent the film from imparting glossiness to a prefinished, for example coated, article when the multilayer film 10 experiences high loading forces. In one embodiment it is preferable for the prefinished surface to have a gloss level between 15 and 30 GU at a gloss angle of measurement of 45° after the protective packaging system is removed. It is generally understood that a higher level of gloss exhibited by the surface is reflected by a higher gloss unit.

In one embodiment, the prefinished article can be a prefinished fiber cement article. In one embodiment, the fibers are cellulose fibers derived, for example, from the pulping of wood. In an alternative embodiment, the fibers are synthetic fibers such as polypropylene, polyethylene and/or polyvinyl alcohol fibers. The cement can be chosen according to knowledge possessed by those of skill in the art, and can be Portland cement. The fiber cement may include other components, such as, for example, siliceous materials, density modifiers, additives, aggregate and water repellants. A fiber cement article provided herein may be destined for use in a building article including, for example, panels, planks, shingles, soffits, fascia, trim pieces, moldings, doors, columns, pilasters, and the like. A fiber cement article may be smooth, textured, shaped or perforated.

In an embodiment, a fiber cement article includes at least one textured surface. In a further embodiment, a multilayer film can be applied to a textured surface of a fiber cement article. In various embodiments, the textured surface may be characterized as matte, eggshell, satin, silk, semi-gloss, gloss, or high gloss as such textures are understood by a person of skill in the art. In a still further embodiment, at least a portion of a fiber cement article can be in contact with a protective packaging system provided herein.

Figure 3:
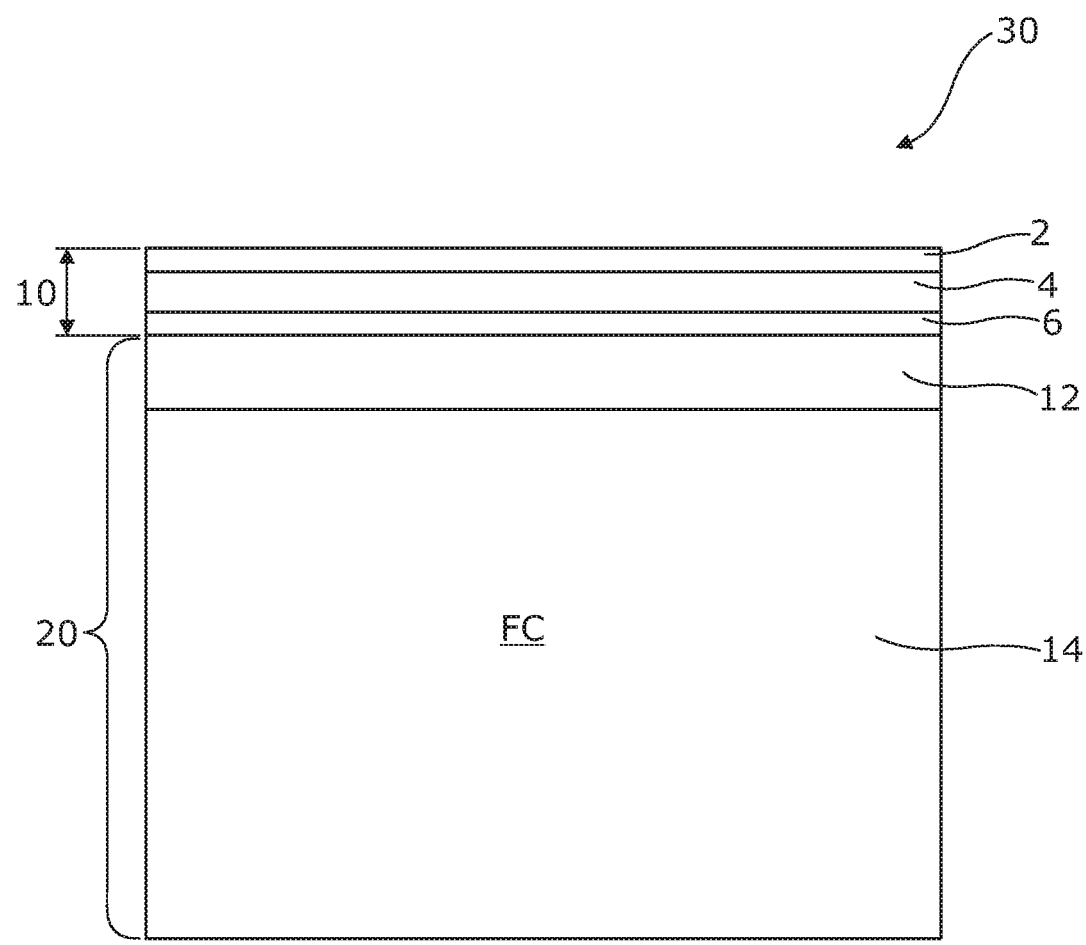
FIG. 3 is a cross-sectional side view of a representative segment of a prefinished fiber cement board to which the protective packaging system of FIG. 1 is attached.

In one embodiment, a prefinished article comprises a prefinished fiber cement article. Referring now to FIG. 3, there is shown a protected prefinished fiber cement article 20 comprising a coating 12, wherein coating 12 comprises one or more coating layers on at least one surface of the fiber cement article 14; and a multilayer film 10 disposed on at least a portion of the coating 12. As illustrated in FIG. 3, in one embodiment, multilayer film 10 is applied to the at least one surface of prefinished fiber cement article 20 such that the adhesive layer 6 of multilayer film 10 is located adjacent to the one or more coating layers 12 on at least one surface of the prefinished fiber cement article 20.

Outer Layer 2

In an embodiment, outer layer 2 can comprise one or more polymers. In an embodiment, outer layer 2 can comprise a low density polyethylene (LDPE). In a further embodiment, outer layer 2 can comprise 20 to 85% by weight low density polyethylene (LDPE), wherein the LDPE can be a linear low density polyethylene (LLDPE), 0 to 75% by weight high density polyethylene (HDPE), and 0 to 80% by weight polypropylene (PP). In a still further embodiment, outer layer 2 can comprise 25 to 40% by weight linear low density polyethylene (LLDPE) and 60 to 75% by weight high density polyethylene (HDPE). In one embodiment, the at least one outer layer can comprise a low density polyethylene and a polypropylene (PP) in a weight ratio of about 1:3 to about 3:1. In one embodiment, outer layer 2 can comprise a low density and a high density polyethylene, wherein the weight ratio of low density polyethylene (LDPE) to high density polyethylene (HDPE) can be about 1:3 to about 3:1.

In an alternative embodiment, outer layer 2 can comprise 50 to 90% by weight low density polyethylene (LDPE) wherein the LDPE can be a linear low density polyethylene (LLDPE), 10 to 50% by weight high density polyethylene (HDPE), and 0 to 50% by weight polypropylene (PP). In a still further embodiment, outer layer 2 can comprise 60 to 80% by weight linear low density polyethylene (LLDPE) and 20 to 40% by weight high density polyethylene (HDPE). In one embodiment, outer layer 2 can comprise a low density and a high density polyethylene, wherein the weight ratio of low density polyethylene (LDPE) to high density polyethylene (HDPE) can be about 1:9 to about 1:1.

In an embodiment the low density polyethylene can be selected to have a Melt Flow Rate (MFR) of approximately 0.5 to 3 g/10 min, or approximately 0.8 to 2.2 g/10 min. In a further embodiment, the low density polyethylene can be selected to have a resin density of approximately 0.91 to 0.94 $g/cm^3$. In all instances, the Melt Flow Rate (MFR) is calculated at 190° C./2.16 Kg in accordance with ASTM D1238 unless otherwise stated.

In a further embodiment, the low density polyethylene can further comprise a linear low density polyethylene wherein the linear low density polyethylene (LLDPE) can be selected to have a Melt Flow Rate (MFR) of approximately 0.5 to 2 g/10 min, or approximately 0.8 to 1.2 g/10 min. In another embodiment, the linear low density polyethylene can be selected to have a resin density of approximately 0.915 to 0.925 $g/cm^3$.

A low density polyethylene component may comprise either a low density polyethylene or a linear low density polyethylene or a combination of both low density polyethylene and linear low density polyethylene.

In an embodiment, the high density polyethylene can be selected to have a Melt Flow Rate (MFR) of approximately 0.1 to 1.2 g/10 min, or approximately 0.3 to 0.85 g/10 min. In another embodiment, the high density polyethylene can be selected to have a resin density of approximately 0.937 to 0.962 g/cm$^3$. In one embodiment, the resin density of the high density polyethylene is approximately 0.94 g/cm$^3$.

In an embodiment, outer layer 2 can comprise a linear low density polyethylene having a Melt Flow Rate (MFR) of approximately 1 g/10 min and resin density of approximately 0.918 g/cm$^3$; and a high density polyethylene having a Melt Flow Rate (MFR) of approximately 0.85 g/10 min and resin density of approximately 0.962 g/cm$^3$.

In a further embodiment, the outer layer 2 can comprise a linear low density polyethylene having a Melt Flow Rate (MFR) of approximately 1 g/10 min and resin density of approximately 0.918 g/cm$^3$; and a high density polyethylene having a Melt Flow Rate (MFR) of approximately 0.3 g/10 min and resin density of approximately 0.937 g/cm$^3$.

In a still further embodiment, outer layer 2 can comprise approximately 25% to 60% linear low density polyethylene having a Melt Flow Rate (MFR) of approximately 1 g/10 min and resin density of approximately 0.918 g/cm$^3$, and approximately 40% to 75% high density polyethylene having a Melt Flow Rate (MFR) of approximately 0.85 g/10 min and resin density of approximately 0.962 g/cm$^3$.

In an alternative embodiment, outer layer 2 can comprise approximately 50% to 90% linear low density polyethylene having a Melt Flow Rate (MFR) of approximately 1 g/10 min and resin density of approximately 0.918 g/cm$^3$, and approximately 10% to 50% high density polyethylene having a Melt Flow Rate (MFR) of approximately 0.3 g/10 min and resin density of approximately 0.937 g/cm$^3$.

In yet further embodiment, outer layer 2 can comprise approximately 75% linear low density polyethylene having a Melt Flow Rate (MFR) of approximately 1 g/10 min and resin density of approximately 0.918 g/cm$^3$, and approximately 25% high density polyethylene having a Melt Flow Rate (MFR) of approximately 0.3 g/10 min and resin density of approximately 0.937 g/cm$^3$.

In an embodiment, when the linear low density polyethylene, high density polyethylene and polypropylene are used together in combination, the % weight amounts are adjusted such that the weight ratio of low density polyethylene and polypropylene fall within the range of between about 3:1 to about 20:1.

In an embodiment, the polypropylene can be selected to have a Melt Flow Rate (MFR) of approximately 2.0 to 2.5 g/10 min. In this instance the Melt Flow Rate (MFR) was calculated at 230° C./2.16 Kg in accordance with ASTM D1238. In another embodiment the polypropylene can be selected to have a resin density of approximately 0.895 to 0.92 g/cm$^3$.

In an embodiment, outer layer 2 can comprise approximately 25% to 75% linear low density polyethylene having a Melt Flow Rate (MFR) of approximately 1 g/10 min and resin density of approximately 0.918 g/cm$^3$, and approximately 25% to 75% polypropylene having a Melt Flow Rate (MFR) of approximately 2 g/10 min and resin density of approximately 0.895 to 0.92 g/cm$^3$. In a further embodiment, outer layer 2 can comprise approximately 40% linear low density polyethylene having a Melt Flow Rate (MFR) of approximately 1 g/10 min and resin density of approximately 0.918 g/cm$^3$ and approximately 60% polypropylene having a Melt Flow Rate (MFR) of approximately 2 g/10 min and resin density of approximately 0.895 to 0.92 g/cm$^3$.

In an alternate embodiment, outer layer 2 can comprise approximately 50% to 90% linear low density polyethylene having a Melt Flow Rate (MFR) of approximately 1 g/10 min and resin density of approximately 0.918 g/cm$^3$, and approximately 10% to 50% high density polyethylene having a Melt Flow Rate (MFR) of approximately 0.3 g/10 min and resin density of approximately 0.94 g/cm$^3$. In a further embodiment, outer layer 2 can comprise approximately 75% linear low density polyethylene having a Melt Flow Rate (MFR) of approximately 1 g/10 min and resin density of approximately 0.918 g/cm$^3$ and approximately 25% high density polyethylene having a Melt Flow Rate (MFR) of approximately 0.3 g/10 min and resin density of approximately 0.94 g/cm$^3$.

Other suitable polymer materials such as polyesters or polycaprolactam may also be used. Specific examples of the composition of outer layer 2 are outlined in Table One below.

TABLE ONE

| | MFR g/10 min | Resin Density g/cm$^3$ | Exemplary Wgt % Range | Example 1 Wgt % | Example 2 Wgt % | Example 3 Wgt % | Example 4 Wgt % | Example 5 Wgt % | Example 6 Wgt % | Example 6a Wgt % |
|---|---|---|---|---|---|---|---|---|---|---|
| LLDPE | 1 | 0.918 | 20 to 85 | 25% | 60% | 75% | 40% | 25% | 70% | 0% |
| HDPE-1 | 0.85 | 0.962 | 0 to 75 | 75% | 40% | 0% | 0% | 0% | 0% | 20% |
| HDPE-2 | 0.3 | 0.937 | 0 to 25 | 0% | 0% | 25% | 0% | 0% | 0% | 0% |
| PP | 2.0 | 0.899 | 0 to 80 | 0% | 0% | 0% | 60% | 75% | 30% | 80% |

In another alternative embodiment, outer layer 2 can comprise low density polyethylene (LDPE) together with either polypropylene (PP) or a combination of a high density polyethylene and polypropylene (PP), wherein the weight ratio of low density polyethylene to polypropylene ranges between about 1:1 to about 9:1, when polypropylene is used in combination with low density polyethylene. In the instance where a combination of low density polyethylene, The melt flow rate and density properties of the polymeric components within the outer layer 2 influence both the Secant modulus and the Elmendorf tear values of the overall multilayer film 10 as explained further below.

In some embodiments, the thickness of the outer layer may be chosen to provide a desired characteristic to the multilayer film. The outer layer may be about 10% to about 25% of the total thickness of the multilayer film. For example, the outer layer may be about 1.9 mil, about 0.25 mil, about 0.3 mil, about 0.35 mil, about 0.4 mil, about 0.45 mil, about 0.5 mil or about 0.59 mil thick, or a range of values therebetween.

In one embodiment, the outer layer is free of roughening agents. In a further embodiment, the outer layer is free of particulates.

Core Layer 4

In an embodiment, core layer 4 can comprise one or more polymers. In an embodiment, core layer 4 can comprise a low density polyethylene (LDPE). In a further embodiment the core layer 4 can comprise at least two low density polyethylene polymers. In a variation, the at least two low density polyethylene polymers comprise a low density polyethylene and a linear low density polyethylene (LLDPE). In one embodiment the core layer 4 can comprise between 10% to 50% by weight low density polyethylene (LDPE) and 50% to 90% by weight linear low density polyethylene (LLDPE). In a further embodiment the low density polyethylene can be selected to have a Melt Flow Rate (MFR) of approximately 0.5 to 3 g/10 min or approximately 0.8 to 2.2 g/10 min. In a yet further embodiment, the low density polyethylene further can be selected to have a resin density of approximately 0.91 to 0.94 g/cm$^3$. In a further embodiment, the linear low density polyethylene can be selected to have a Melt Flow Rate (MFR) of approximately 0.5 to 2 g/10 min or approximately 0.8 to 1.2 g/10 min. In a yet further embodiment, the linear low density polyethylene further can be selected to have a resin density of approximately 0.915 to 0.925 g/cm$^3$. In another embodiment core layer 4, can further comprise polypropylene in addition to low density polyethylene or instead of low density polyethylene such that core layer 4 comprises linear low density polyethylene (LLDPE) and polypropylene or linear low density polyethylene (LLDPE), low density polyethylene and polypropylene. In one embodiment, core layer 4 comprises 50% to 90% by weight linear low density and 10% to 50% by weight polypropylene relative to the total % weight of core layer 4.

In an embodiment, the low density polyethylene can have a Melt Flow Rate of approximately 2 g/10 min and a resin density of approximately 0.925 g/cm$^3$ and the linear low density polyethylene can have a Melt Flow Rate of approximately 1 g/10 min and a resin density of approximately 0.918 g/cm$^3$. In one embodiment, the polypropylene can have a Melt Flow Rate (MFR) of approximately 2 g/10 min and resin density of approximately 0.895 to 0.92 g/cm$^3$.

In one embodiment, core layer 4 can comprise approximately 75% by weight low density polyethylene having a Melt Flow Rate (MFR) of approximately 2 g/10 min and resin density of approximately 0.925 g/cm$^3$, approximately 25% by weight linear low density polyethylene having a Melt Flow Rate (MFR) of approximately 1 g/10 min and resin density of approximately 0.918 g/cm$^3$ In a further embodiment core layer 4 optionally further comprises a high density polyethylene polymer.

In an embodiment, core layer 4 can further comprises a roughening agent. In one embodiment, the roughening agent can be particulate matter, and preferably the particulate matter is in the form of an inorganic particulate. In one embodiment the inorganic particulate is calcium carbonate (CaCO$_3$). Generally, an inorganic particulate, such as, for example, calcium carbonate, is dispersed in a polymer, such as, for example, a low density polyethylene polymer, to create a resin mixture. A resin mixture may be incorporated, along with other polymers and/or other resin mixtures, in a core layer or adhesive layer as provided herein. In an embodiment, a roughening agent can comprise particles having an average diameter of 15 to 30 µm, and preferably approximately 22 µm. In a further embodiment, the ratio of total multilayer film thickness to average particle diameter can be about 1:1 to 5:1, about 1.5:1 to 4:1, about 1.5:1 to 3:1, or about 2:1 to 3:1. In a further embodiment, the ratio of core layer film thickness to average particle diameter can be about 3:1 to 0.5:1, about 2:1 to 0.5:1, about 2:1 to 1:1, or about 1:1.

In an embodiment, the core layer can comprise a calcium carbonate (CaCO$_3$) in polyethylene resin mixture (PE/CaCO$_3$). In a further embodiment, the core layer can comprise about 60-80% by weight calcium carbonate in polyethylene. In an embodiment, the core layer comprises a resin mixture comprising about 70% by weight calcium carbonate in polyethylene. In a preferable embodiment, the 70% by weight calcium carbonate in polyethylene resin mixture to can be selected for a Melt Flow Rate of approximately 5 g/10 min and a resin density of approximately 1.72 g/cm$^3$.

In an embodiment, core layer 4 can comprise approximately 60% by weight low density polyethylene having a Melt Flow Rate (MFR) of approximately 2 g/10 min and resin density of approximately 0.922 g/cm$^3$, approximately 20% by weight linear low density polyethylene having a Melt Flow Rate (MFR) of approximately 1 g/10 min and resin density of approximately 0.918 g/cm$^3$ and 20% by weight of a 70% by weight calcium carbonate in polyethylene resin mixture having a Melt Flow Rate (MFR) of approximately 5 g/10 min and resin density of approximately 1.72 g/cm$^3$.

In a further embodiment, core layer 4 can comprise approximately 40% by weight low density polyethylene having a Melt Flow Rate (MFR) of approximately 2 g/10 min and resin density of approximately 0.922 g/cm$^3$, approximately 15% by weight linear low density polyethylene having a Melt Flow Rate (MFR) of approximately 1 g/10 min and resin density of approximately 0.918 g/cm$^3$, approximately 20% by weight of an approximately 70% by weight calcium carbonate in polyethylene resin mixture having a Melt Flow Rate (MFR) of approximately 5 g/10 min and resin density of approximately 1.72 g/cm$^3$ and approximately 25% by weight high density polyethylene having a Melt Flow Rate (MFR) of approximately 0.85 g/10 min and resin density of approximately 0.962 g/cm$^3$.

In a still further embodiment, core layer 4 can comprise approximately 20% by weight low density polyethylene having a Melt Flow Rate (MFR) of approximately 2 g/10 min and resin density of approximately 0.922 g/cm$^3$, approximately 20% by weight linear low density polyethylene having a Melt Flow Rate (MFR) of approximately 1 g/10 min and resin density of approximately 0.918 g/cm$^3$, approximately 20% by weight of an approximately 70% by weight calcium carbonate in polyethylene resin mixture having a Melt Flow Rate (MFR) of approximately 5 g/10 min and resin density of approximately 1.72 g/cm$^3$ and approximately 40% by weight high density polyethylene having a Melt Flow Rate (MFR) of approximately 0.85 g/10 min and resin density of approximately 0.962 g/cm$^3$.

Specific examples of the composition of the core layer 4 are outlined in Table Two below.

TABLE TWO

|  | MFR (g/10 min) | Resin Density (g/cm³) | Exemplary wgt % range | Example 7 | Example 8 | Example 9 | Example 9a | Example 9b |
| --- | --- | --- | --- | --- | --- | --- | --- | --- |
| LDPE | 2 | 0.922 | 0 to 60 | 60.0% | 40.0% | 20.0% | .025% | 0.00% |
| LLDPE-C4 | 1 | 0.918 | 0 to 40 | 20.0% | 15.0% | 20.0% | 75.0% | 50.0% |
| PE/CaCO₃ | 5 | 1.72 | 15 to 25 | 20.0% | 20.0% | 20.0% | 0.00% | 0.00% |
| HDPE | 0.85 | 0.962 | 0 to 40 | 0.00% | 25.0% | 40.0% | 0.00% | 0.00% |
| PP | 2 | 0.92 | 10 to 50 | 0.00% | 0.00% | 0.00% | 0.00% | 50.0% |

In some embodiments, the thickness of the core layer may be chosen to provide a desired characteristic to the multilayer film. The core layer may be about 50% to about 75% of the total thickness of the multilayer film. For example, the core layer may have a thickness that is in a range between approximately 1.0 and 1.57 mil. In one embodiment, the thickness of the core layer is approximately 1.48 mil. In alternate embodiments the core layer is about 1 mil, about 1.1 mil, about 1.2 mil, about 1.3 mil, about 1.4 mil, about 1.48 mil, about 1.52 mil, about 1.57 mil thick or a range of values therebetween.

Adhesive Layer 6

The adhesive layer 6 is advantageously selected to have appropriate adhesion to a prefinished article over a range of temperatures of application, storage, and removal. The adhesive layer 6 advantageously provides enough adhesion to affix a multilayer film to a prefinished article, but not so much adhesion that the article is damaged when the film is removed.

Furthermore, without wishing to be bound by theory, it is believed that surface energy of an article impacts on adhesion of a film to that article. For example, a variety of films will adhere to an article with surface energy of 50 dyne/cm (50×10⁻³ N/m) and above.

In contrast, few films will adhere to an article, for example, with a surface energy of less than approximately 25 dyne/cm (25×10⁻³ N/m). Accordingly, it follows that the surface energy of the prefinished article impacts on the ability of a multilayer film 10 to adhere to a prefinished article, having, for example, a coated surface.

In an embodiment, a prefinished article can have a surface energy of approximately 30 dyne/cm (30×10⁻³ N/m)±2 dyne/cm (2×10⁻³ N/m). Advantageously, adhesive layer 6 has a bonding strength of approximately 10 to 100 g/inch to a coated substrate. For example, in one embodiment, adhesive layer 6 achieves a bonding strength of approximately 10 to 100 g/inch when adhering to a surface which has a surface energy of approximately 30 dyne/cm (30×10⁻³ N/m)±2 dyne/cm (2×10⁻³ N/m).

In an embodiment, adhesive layer 6 can comprise one or more polymers. In an embodiment, the polymers of the adhesive layer 6 are selected from ethylene methacrylate, acrylic acid, ethylene acrylic acid copolymer, acid modified ethylene acrylate terpolymer, thermoplastic acrylates, maleic anhydride modified ethylene-vinyl acetate copolymer (MAH-EVA), and combinations thereof, wherein the or each polymer selected can be characterized by a selected Vicat softening point and/or a selected melt flow rate (MFR). In a further embodiment, adhesive layer 6 can comprise ethylene acrylic acid (EAA) copolymer, ethylene methacrylate (EMA) copolymer, acid modified ethylene acrylate terpolymer, optionally polyethylene resin mixture comprising particulate calcium carbonate (CaCO₃), and optionally maleic anhydride modified ethylene-vinyl acetate copolymer (MAH-EVA). The terpolymer may comprise modified EVA. In an embodiment, the Vicat softening point of a polymer in the adhesive layer 6, or of the adhesive layer 6, can be approximately 95° F. (35° C.) to 130° F. (54.4° C.), or preferably approximately 104° F. (40° C.) to 120° F. (48.9° C.). In an embodiment, adhesive layer 6 can comprise at least one polymer including a carboxyl group. In an alternate embodiment adhesive layer 6 can comprise ethylene acrylic acid (EAA) copolymer, ethylene methacrylate (EMA) copolymer, and maleic anhydride modified ethylene-vinyl acetate copolymer (MAH-EVA). Optionally, adhesive layer 6 further comprises tackifiers such as, for example, terpene phenolic and/or elastomers. In one embodiment a suitable tackifier is Sylvares® TP 95 (Arizona Chemicals) and a suitable elastomer is polyisobutylene (PIB) with Tg at −20° C.

Adhesive layer 6 can comprise ethylene acrylic acid (EAA) copolymer with different acidic co-monomer contents. There are many types of EAA copolymers suitable for use, for example, EAA copolymers comprising approximately 3.0%, 6.5%, 8.0%, 9.7%, 11.5%, 20.5% acid co-monomer content, or values therebetween. In some embodiments, the EAA copolymers can comprise 15-40% acid co-monomer content, or preferably 20-25% acid co-monomer content, or most preferably 20.5% acid co-monomer content.

In a further embodiment, adhesive layer 6 can further comprise ethylene methacrylate (EMA) copolymer. Conveniently, ethylene methacrylate (EMA) copolymer is compatible with ethylene acrylic acid (EAA) copolymer.

In a further embodiment, adhesive layer 6 can further comprise acid modified ethylene acrylate terpolymer with medium to high acid co-monomer contents.

In a further embodiment, adhesive layer 6 can further comprise acid modified acrylate. For example, the acid modified acrylate can be acid modified ethylene acrylate.

In a further embodiment, adhesive layer 6 can further comprise about 0 to 20% polyethylene resin mixture comprising approximately 70% by weight calcium carbonate particulate (PE/CaCO₃).

In a further embodiment, adhesive layer 6 can further comprise maleic anhydride modified ethylene-vinyl acetate copolymer (MAH-EVA). In one embodiment, the MAH-EVA can be characterized by a melt flow rate of 5 to 12 g/10 min.

In an embodiment as set out in Table Three below, adhesive layer 6 can comprise approximately 10-80% ethylene acrylic acid wherein the ethylene acrylic acid is approximately 20% acrylic acid comonomer, having a Vicat softening temperature of approximately 108° F. (42.2° C.); approximately 0-50% ethylene methacrylate wherein the ethylene methacrylate is approximately 24% methyl acrylate comonomer, having a Vicat softening temperature of approximately 109° F. (43° C.); approximately 0-50% acid modified ethylene acrylate having a Vicat softening temperature of approximately 140° F. (60° C.); approximately 0-20% of polyethylene resin mixture comprising approximately 70% by weight calcium carbonate ("PE/CaCO$_3$") and having a Melt Flow Rate (MFR) of approximately 5 g/10 min and resin density of approximately 1.72 g/cm$^3$; and 0-30% maleic anhydride modified ethylene-vinyl acetate copolymer (MAH-EVA) having a melt flow rate of 5 to 12 g/10 min and resin density of approximately 0.9 to 1.0 g/cm$^3$. Additional example compositions of adhesive layer 6 are set out in Table Four.

The examples of adhesive layer 6 are suitable for use on a prefinished surface comprising a typical coating and having a surface energy of, for example, approximately 30 dyne/cm (30×10$^{-3}$ N/m).

TABLE THREE

|  | MFR (g/10 min) | Resin Density (g/cm$^3$) | Exemplary wgt % range |
|---|---|---|---|
| EAA | 14 | 0.958 | 10 to 80% |
| EMA | 10 | 0.945 | 0 to 50% |
| Acid Modified Ethylene Acrylate Terpolymer | 10 | 0.93 | 0 to 50% |
| PE/CaCO$_3$ | 5 | 1.72 | 0 to 20% |
| MAH-EVA | 5-12 | 0.9-1.0 | 0 to 30% |

TABLE FOUR

| Example | EAA wgt % | EMA wgt % | Acid Modified Ethylene Acrylate Terpolymer wgt % | PE/CaCO$_3$ wgt % | MAH-EVA wgt % |
|---|---|---|---|---|---|
| 10 | 40 | 35 | 20 | 5 | 0 |
| 11 | 40 | 25 | 10 | 5 | 20 |
| 12 | 60 | 25 | 10 | 5 | 0 |
| 13 | 60 | 20 | 5 | 5 | 10 |
| 14 | 40 | 30 | 15 | 5 | 10 |

In some embodiments, the adhesive layer 6, further comprises at least one biocide, wherein the at least one biocide is in the form of Zinc Pyrithione or Silver Phosphate or a combination of both Zinc Pyrithione and Silver Phosphate, wherein the ratio of Zinc Pyrithione to Silver Phosphate is in the range of 1:3 to 3:1. In practice, the at least one biocide is combined with one of the components of the adhesive layer 6, for example ethylene acrylic acid (EAA) copolymer before being combined with the other components and extruded to form the adhesive layer 6. The % weight of the at least one biocide ranges between approximately 0.2 weight % and 1.0 weight % based on the % weight of the total mass of the adhesive layer 6.

In some embodiments, the thickness of the adhesive layer may be chosen to provide a desired characteristic to the multilayer film. The adhesive layer may be about 10% to about 25% of the total thickness of the multilayer film. For example, the adhesive layer may be about 0.25 mil, about 0.3 mil, about 0.35 mil, about 0.4 mil, about 0.45 mil, or about 0.5 mil thick, or a range of values therebetween.

Samples of Multilayer Film Combinations:

Each of the various embodiments of the outer layer 2, core layer 4 and adhesive layer 6 can be combined with any embodiment of each of the other layers to form a multilayer film system as provided herein. Various samples of the multilayer film systems are set out below in Table Five. It should be understood that each of the outer layer 2, core layer 4 and adhesive layer 6 are interchangeable with each other in accordance with the multilayer film system requirements.

TABLE FIVE

| SAMPLE | Outer Layer | Core Layer | Adhesive Layer |
|---|---|---|---|
|  | Example 3 | Example 7 | Example 10 |
| 1 | 75% LLDPE<br>25% HDPE-2 | 60% LDPE<br>20% LLDPE-C4<br>20% PE/CaCO$_3$ | 40% EAA<br>35% EMA<br>20% Acid Modified Ethylene Acrylate Terpolymer<br>5% PE/CaCO$_3$ |
|  | Example 2 | Example 8 | Example 10 |
| 2 | 60% LLDPE<br>40% HDPE-1 | 40% LDPE<br>15% LLDPE-C4<br>20% PE/CaCO$_3$<br>25% HDPE | 40% EAA<br>35% EMA<br>20% Acid Modified Ethylene Acrylate Terpolymer<br>5% PE/CaCO$_3$ |
|  | Example 1 | Example 9 | Example 10 |
| 3 | 25% LLDPE<br>75% HDPE-1 | 20% LDPE<br>20% LLDPE-C4<br>20% PE/CaCO$_3$<br>40% HDPE | 40% EAA<br>35% EMA<br>20% Acid Modified Ethylene Acrylate Terpolymer<br>5% PE/CaCO$_3$ |
|  | Example 1 | Example 7 | Example 10 |
| 4 | 25% LLDPE<br>75% HDPE-1 | 60% LDPE<br>20% LLDPE-C4<br>20% PE/CaCO$_3$ | 40% EAA<br>35% EMA<br>20% Acid Modified Ethylene Acrylate Terpolymer<br>5% PE/CaCO$_3$ |
|  | Example 4 | Example 7 | Example 10 |
| 5 | 40% LLDPE<br>60% PP | 60% LDPE<br>20% LLDPE-C4<br>20% PE/CaCO$_3$ | 40% EAA<br>35% EMA<br>20% Acid Modified Ethylene Acrylate Terpolymer<br>5% PE/CaCO$_3$ |
|  | Example 1 | Example 7 | Example 11 |
| 6 | 25% LLDPE<br>75% HDPE-1 | 60% LDPE<br>20% LLDPE-C4<br>20% PE/CaCO$_3$ | 40% EAA<br>25% EMA<br>10% Acid Modified Ethylene Acrylate Terpolymer<br>5% PE/CaCO$_3$<br>20% MAH-EVA |
|  | Example 1 | Example 7 | Example 12 |
| 7 | 25% LLDPE<br>75% HDPE-1 | 60% LDPE<br>20% LLDPE-C4<br>20% PE/CaCO$_3$ | 60% EAA<br>25% EMA<br>10% Acid Modified Ethylene Acrylate Terpolymer<br>5% PE/CaCO$_3$<br>0% MAH-EVA |

TABLE FIVE-continued

| SAMPLE | Outer Layer | Core Layer | Adhesive Layer |
|---|---|---|---|
| | Example 1 | Example 7 | Example 13 |
| 8 | 25% LLDPE<br>75% HDPE-1 | 60% LDPE<br>20% LLDPE-C4<br>20% PE/CaCO$_3$ | 60% EAA<br>20% EMA<br>5% Acid Modified Ethylene Acrylate Terpolymer<br>5% PE/CaCO$_3$<br>10% MAH-EVA |
| | Example 1 | Example 7 | Example 14 |
| 9 | 25% LLDPE<br>75% HDPE-1 | 60% LDPE<br>20% LLDPE-C4<br>20% PE/CaCO$_3$ | 40% EAA<br>30% EMA<br>15% Acid Modified Ethylene Acrylate Terpolymer<br>5% PE/CaCO$_3$<br>10% MAH-EVA |
| | Example 5 | Example 7 | Example 14 |
| 10 | 25% LLDPE<br>75% PP | 60% LDPE<br>20% LLDPE-C4<br>20% PE/CaCO$_3$ | 40% EAA<br>30% EMA<br>15% Acid Modified Ethylene Acrylate Terpolymer<br>5% PE/CaCO$_3$<br>10% MAH-EVA |
| | Example 5 | Example 7 | Example 12 |
| 11 | 25% LLDPE<br>75% PP | 60% LDPE<br>20% LLDPE-C4<br>20% PE/CaCO$_3$ | 60% EAA<br>25% EMA<br>10% Acid Modified Ethylene Acrylate Terpolymer<br>5% PE/CaCO$_3$<br>0% MAH-EVA |
| | Example 5 | Example 7 | Example 13 |
| 12 | 25% LLDPE<br>75% PP | 60% LDPE<br>20% LLDPE-C4<br>20% PE/CaCO$_3$ | 60% EAA<br>20% EMA<br>5% Acid Modified Ethylene Acrylate Terpolymer<br>5% PE/CaCO$_3$<br>10% MAH-EVA |
| | Example 3 | Example 7 | Example 10 |
| 13 | 75% LLDPE<br>25% HDPE-2 | 60% LDPE<br>20% LLDPE-C4<br>20% PE/CaCO$_3$ | 40% EAA<br>35% EMA<br>20% Acid Modified Ethylene Acrylate Terpolymer<br>5% PE/CaCO$_3$<br>0% MAH-EVA |
| | Example 6 | Example 7 | Example 10 |
| 14 | 70% LLDPE<br>30% PP | 60% LDPE<br>20% LLDPE-C4<br>20% PE/CaCO$_3$ | 40% EAA<br>35% EMA<br>20% Acid Modified Ethylene Acrylate Terpolymer<br>5% PE/CaCO$_3$<br>0% MAH-EVA |
| | Example 4 | Example 7 | Example 10 |
| 15 | 40% LLDPE<br>60% PP | 60% LDPE<br>20% LLDPE-C4<br>20% PE/CaCO$_3$ | 40% EAA<br>35% EMA<br>20% Acid Modified Ethylene Acrylate Terpolymer<br>5% PE/CaCO$_3$<br>0% MAH-EVA |
| | Example 5 | Example 7 | Example 10 |
| 16 | 25% LLDPE<br>75% PP | 60% LDPE<br>20% LLDPE-C4<br>20% PE/CaCO$_3$ | 40% EAA<br>35% EMA<br>20% Acid Modified Ethylene Acrylate Terpolymer<br>5% PE/CaCO$_3$<br>0% MAH-EVA |
| | Example 3 | Example 9a | Example 15 |
| 17 | 75% LLDPE<br>25% HDPE | 75% LDPE<br>25% LLDPE | 25% EAA<br>75% EMA |
| | Example 6a | Example 9b | Example 15 |
| 18 | 80% PP<br>20% HDPE | 50% PP<br>50% LLDPE | 25% EAA<br>75% EMA |

In further embodiments, the adhesive layer 6 of each of the above sample multilayer films 10, can be combined with at least one biocide combination as set out in Table Five(a) relative to the % weight of the adhesive layer 6. In certain embodiments, the at least one biocide combination was combined with a component of the adhesive layer 6, for example, ethylene acrylic acid (EAA) or any other suitable polymeric component such as, for example, polyethylene before being combined with the other components of the adhesive layer.

TABLE FIVE(A)

| Bio Resistant Combinations | Zinc Pyrithione (100% Solids) weight % | Silver Phosphate weight % |
|---|---|---|
| 1 | 1 | 0 |
| 2 | 0.5 | 0 |
| 3 | 0.5 | 0.5 |
| 4 | 0.2 | 0.2 |
| 5 | 0.125 | 0.125 |

The efficacy of the bioresistant combinations as set out in Table Five(a) were tested in accordance with ASTM Method G-21-15 'Determining resistance of synthetic polymeric materials to fungi'. In each instance, a potato dextrose agar medium was inoculated with a combination of fungal medium including *Aspergillus brasiliensis* also known as *Aspergillus niger* (ATCC #9642); *Aureobasidium pullulans* (ATCC #15233); *Chaetomium globosum* (ATCC #6205); *Talaromyces pinophilus* also known as *Penicillium funiculosum* (ATCC #11797); and *Trichoderma virens* (ATCC #9645). Multilayer films 10 in accordance with the invention were placed over the medium. In each instance, a first sample of the multilayer film 10 was placed such that the adhesive layer 6 was exposed to the potato dextrose agar medium and a second sample was placed such that the outer layer 2 was exposed to the potato dextrose agar medium. In all instances, each of the bio resistant combinations showed that fungal growth was restricted particularly when the adhesive layer 6 was exposed to the potato dextrose agar medium. Whilst all bio resistant combinations showed resistance to fungal or mold growth, a multilayer film comprising bio resistant combination 1, comprising 1.0 weight % Zinc Pyrithione and bio resistant combination 3, comprising 0.5 weight % Zinc Pyrithione and 0.5 weight % Silver Phosphate showed an inhibition zone around the multifilm layer between approximately 10 to 20 mm.

A multilayer film 10 can be manufactured using techniques known to persons skilled in the art, such as, for example, blow molding, extrusion or casting. Other suitable techniques are known to persons skilled in the art.

Furthermore in each of the samples outlined above in Table Five, the ratio of the % thickness of each of the outer layer 2, core layer 4 and adhesive layer 6 relative to each other varies between approximately 1:2:1 and 3:15:2 as set out in Table Six below.

TABLE SIX

|  | Example A % relative thickness | Example B % relative thickness | Example C % relative thickness |
| --- | --- | --- | --- |
| Outer layer | 20 | 25 | 30 |
| Core layer | 60 | 50 | 40 |
| Adhesive layer | 20 | 25 | 30 |
| Ratio | 1:3:1 | 1:2:1 | 3:4:3 |

In a further embodiment, multilayer film 10 has a total thickness of approximately 1.8 mil (45.7 µm) to 2.3 mil (58.4 µm), wherein the total thickness of multilayer film 10 as seen in FIG. 1 is the average distance D between opposing surfaces 2a and 6a of the outer layer 2 and the adhesive layer 6 respectively. In a preferred embodiment the total thickness of the multilayer film can be approximately 1.95 mil (49.5 µm).

An advantage of a multilayer film 10 provided herein is that a film is formed which can be stretched during the lamination process without tearing or causing substantial shrink back after lamination, thus providing excellent coverage for a surface of a prefinished article. For example, substantial shrink back may be shrinkage sufficient to expose a portion of the laminated surface of the prefinished article. Furthermore, a total thickness of multilayer film 10 as provided herein is chosen to be sufficient to provide protection to a surface of a prefinished article during handling and storage. As outlined in Table Seven, the total thickness of a multilayer film is chosen to provide a balance between stretch/coverage and protection. In Table Seven, various total film thicknesses were tested to determine the impact of total thickness on a lamination process (film stretch and retraction following application to a prefinished article), and subsequent damage to a prefinished article during stacking and transportation.

TABLE SEVEN

| Example | Total Thickness | Lamination Process Impact | Shipping and Stacking Damage |
| --- | --- | --- | --- |
| 1a | 1.75 mil (44.5 µm) | Easily stretched- coverage issues | Film torn-prefinished FC article damaged |
| 1b | 2.0 mil (50.8 µm) | Little stretch-no coverage issues | Minor tear in film-no damage to prefinished FC article |
| 1c | 2.3 mil (58.4 µm), | No stretch-coverage issues | No film damage-no damage to prefinished FC article |

Certain physical properties of various samples of multilayer films provided above wherein the thickness of each of the outer layer, core layer and adhesive layer of the film were in a ratio of 1:3:1 were measured (see Table Eight below). It was found that the Secant modulus MD (1%) for the various samples was between approximately 17,000 and approximately 26,500 psi and the Secant modulus CD (1%) was between approximately 22,100 and approximately 33,000 psi. The Elmendorf tear resistance (MD) was between approximately 30 and 65, and (CD) was between approximately 360 and 820. The Secant modulus was measured in accordance with ASTM D882 whilst the Elmendorf tear resistance was measured in accordance with ASTM D1922.

TABLE EIGHT

|  | Sample 1 | Sample 2 | Sample 4 | Sample 5 |
| --- | --- | --- | --- | --- |
| Ratio of thickness of outer layer:core layer: adhesive layer | 1:3:1 | 1:3:1 | 1:3:1 | 1:3:1 |
| Secant modulus MD (1%) | 17089 psi | 26500 psi | 24481 psi | 22019 psi |
| Secant modulus CD (1%) | 22121 psi | 32367 psi | 29460 psi | 23553 psi |
| Elmendorf tear resistance MD | 32 | 57 | 60 | 44 |
| Elmendorf tear resistance CD | 378 | 83 | 588 | 487 |

In one embodiment it is preferable for multilayer film 10 to have a Secant modulus Machine Direction (MD) (1%) between approximately 17,000 and approximately 26,500 psi. In a further embodiment, it is preferable for multilayer film 10 to have a Secant modulus Cross Machine Direction (CD) (1%) between approximately 22,100 and approximately 33,000 psi. The Secant modulus is measured in accordance with ASTM D882. In another embodiment it is preferable for multilayer film to further have an Elmendorf tear resistance (MD) between approximately 30 and 65; and Elmendorf tear resistance (CD) between approximately 360 and 820. The Elmendorf tear resistance is measured in accordance with ASTM D1922.

In an embodiment, a multilayer film incorporates UV resistance. Thus, a multilayer film can be pigmented to block UV rays. UV resistance can be advantageous when, for example, the protective packaging system is desired to be temporarily left in place to protect the finished fiber cement article from soiling or damage in the field. Persons of skill in the art have knowledge and skills to incorporate UV protection in a multilayer film provided herein.

Multilayer films provided herein may be treated with Corona or other surface treatment technologies to aid adhesion. Such techniques are known to those of skill in the art. A Corona treatment can be conducted during manufacture, or prior to laminating the multilayer film on a prefinished article.

Methods

Figure 4:
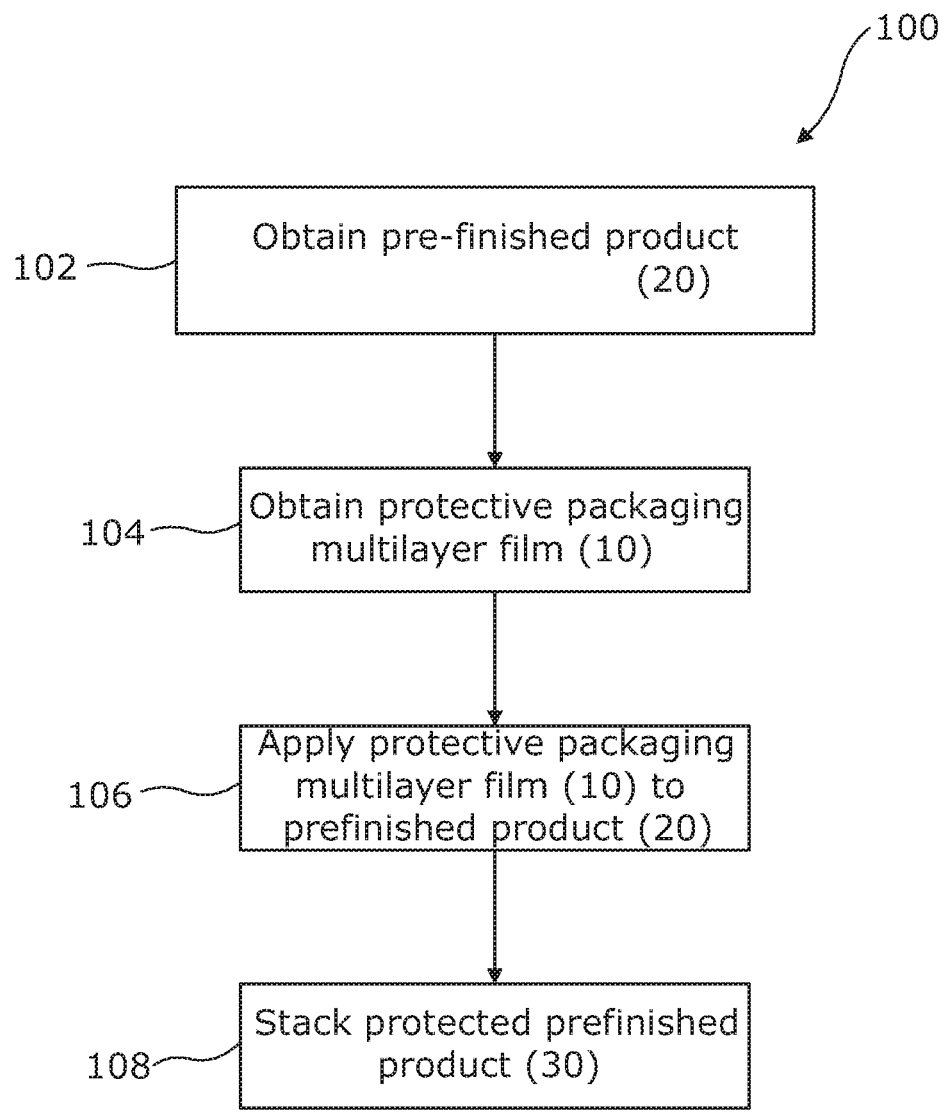
FIG. 4 is a flow chart outlining the steps of the method for attaching the protective packaging system of FIG. 1 to a prefinished fiber cement board.

Referring now to FIG. 4, there is shown a method 100 of applying a protective packaging system or multilayer film 10 to a prefinished fiber cement article 20 to form a protected prefinished article or product 30. In step 102, a user obtains a prefinished article or product 20. In one embodiment the prefinished article or product is in the form of a fiber cement article having one or more coating layers. The prefinished article 20 can be finished with any suitable finish. Suitable finishes include coatings well known in the art, for example, paints, stains and primers including water-based paint, solvent-based paint, oil-based paint, or high solid paint; latex-, alkyd-, epoxy-, urethane-, or acrylic-based finishes; primer coats; or powder coats. Persons of skill in the art have the knowledge and skill to apply appropriate coating application and curing methods when needed. In step 104, the end user obtains a protective packaging system or multilayer film 10 comprising at least one outer layer 2, at least one core layer 4 and at least one adhesive layer 6 as described above. The multilayer film 10 should have a size and shape adapted to that of the surfaces of article 20 that are desired to be protected. In step 106, the protective packaging system or multilayer film 10 is applied to the prefinished article or product 20.

Once the protective packaging system or multilayer film 10 has been applied to the prefinished article or product 20, the protected prefinished article or product 30 is formed. In step 108, the protected prefinished article or product 30 is stacked ready for storage and/or transport for use in the field.

In one embodiment the protective packaging system or multilayer film 10 is applied to the prefinished article or product 20 using a typical lamination process. The lamination process may be a machine process or a manual process. In one embodiment the lamination process includes the use of heated rollers to soften the at least one adhesive layer 6 during the lamination process. In this way, the at least one adhesive layer 6 is sufficiently ductile or malleable during the application process to adapt to the surface morphology of the prefinished article. Conveniently the at least one outer layer 2 and the at least one core layer 4 support the at least one adhesive layer 6 in this softened state. The combined effect of the structure provided by the at least one outer layer 2 and the at least one core layer 4 together with the malleability of the at least one adhesive layer 6 ensures that the multilayer film 10 achieves excellent coverage of the prefinished article 20 during and after the application or lamination process.

The protected articles can be stacked for storage and transport. In an embodiment, protected fiber cement articles can be stacked face-to-back without damaging the laminated surfaces. In another embodiment, the protected fiber cement articles are stacked face-to-face and/or back-to-back.

Testing

Various Samples were tested for lamination process compatibility, adhesion, and surface lamination coverage.

A multilayer film according to Sample 1 was applied to a fiber cement board at two different process temperatures, a high temperature and a low temperature. The process temperatures were chosen to represent conditions during a large scale lamination process.

A protective packaging system according to Sample 1 was applied to a coated fiber cement article. The board was left in an unrestrained state and the percentage of film adhering to the surface was measured as the board left the lamination process line. Film coverage was acceptable at both high lamination temperature and low lamination temperature (where acceptable coverage was >95% coverage of the coated fiber cement surface).

A protected fiber cement article was exposed to a simulated aging test. The laminated board was kept at elevated temperature for two hours with a pressure applied to the laminated surface. Conditions were chosen to simulate storage of stacked fiber cement articles. Following simulated aging, the boards were exposed to various simulated field removal temperatures. Peel adhesion was measured at the simulated field removal temperatures. The results of simulated field removal following simulated aging are presented in Table Nine. In Table Nine, an X indicates acceptable adhesion in the simulated field removal (where acceptable adhesion was <350 g/inch).

TABLE NINE

| Before Aging | After Aging (simulated field removal temperature) | | | | | |
|---|---|---|---|---|---|---|
| Initial = immediately after lamination | 72 F. | 140 F. | 72 F. | 32 F. | 0 F. | −22 F. |
| X | X | X | X | X | X | X |

Multilayer films according to Samples 13-16 were applied to the fiber cement board at two different process temperatures, a high temperature and a low temperature. The process temperatures were chosen to represent conditions during a large scale lamination process. Lamination coverage as percent area coverage was measured immediately following lamination, and five minutes after lamination. The results are presented in Table Ten (high temperature) and Table Eleven (low temperature).

TABLE TEN

Surface coverage following lamination at high temperature

| Sample | Right after lamination | 5 mins after lamination |
|---|---|---|
| 13 | 99% | 92% |
| 14 | 99% | 88% |
| 15 | 99% | 85% |
| 16 | 99% | 90% |

TABLE ELEVEN

Surface coverage following lamination at low temperature

| Sample | Right after lamination | 5 mins after lamination |
|---|---|---|
| 13 | 92% | 66% |
| 14 | 99% | 80% |
| 15 | 97% | 88% |
| 16 | 99% | 90% |

The foregoing description has shown, described and pointed out fundamental novel features of protective packaging systems provided herein. The various compositions, methods, procedures, and techniques described above provide a number of ways to carry out the described embodiments and arrangements. Of course, not necessarily all features, objectives or advantages described are required and/or achieved in accordance with any particular embodiment described herein. Also, although the invention has been disclosed in the context of certain embodiments, arrangements and examples, it will be understood by those skilled in the art that the invention extends beyond the specifically disclosed embodiments to other alternative embodiments, combinations, sub-combinations and/or uses, modifications and equivalents thereof. Accordingly, the invention is not intended to be limited by the specific disclosures of the embodiments herein. Moreover, although features may be described above as acting in certain combinations, one or more features from a claimed combination can, in some cases, be excised from the combination, and the combination may be claimed as any subcombination or variation of any subcombination.

What is claimed is:

1. A protective packaging system for providing temporary protection of a top coating on a prefinished building article, comprising:
   an outer layer, said outer layer comprising 50% to 90% by weight of a low density polyethylene (LDPE) and 10% to 50% by weight of a high density polyethylene (HDPE), wherein the LDPE and the HDPE are present in the outer layer in a mass ratio of about 1:1 to about 9:1;

an adhesive layer, said adhesive layer comprising ethylene methacrylate copolymer, ethylene acrylic acid copolymer, Maleic anhydride (MAH)—ethylene vinyl acetate (EVA), and at least one biocide, wherein the at least one biocide is in the form of a combination of Zinc Pyrithione and Silver Phosphate, wherein the ratio of Zinc Pyrithione to Silver Phosphate is in the range of 1:3 to 3:1; and a core layer disposed between the outer layer and the adhesive layer, wherein the core layer comprises a linear low density polyethylene and a low density polyethylene.

2. The protective packaging system of claim 1, wherein the core layer and the adhesive layer further comprise a roughening agent, wherein the roughening agent comprises inorganic particulates dispersed in a polyethylene resin mixture in a manner such that at least some of the inorganic particulates protrude from the core layer and the adhesive layer.

3. The protective packaging system of claim 2, wherein the roughening agent comprises particulate $CaCO_3$.

4. The protective packaging system of claim 3, wherein the roughening agent comprises particulate $CaCO_3$ having a particle size of about 15 to 30 µm.

5. The protective packaging system of claim 1, wherein the relative thicknesses of the outer layer, the core layer, and the adhesive layer respectively are about 1:2:1 to about 3:15:2.

6. The protective packaging system of claim 1, wherein the relative thicknesses of the outer layer, the core layer, and the adhesive layer respectively are about 3:15:2.

7. The protective packaging system of claim 1, having a thickness of about 1.75 mil (44.5 µm) to about 2.3 mil (58.4 µm).

8. The protective packaging system of claim 7, having a thickness of about 2 mil (50.8 µm).

9. The protective packaging system of claim 1, wherein the ethylene acrylic acid has an acid co-monomer content of about 20% to about 25%.

10. The protective packaging system of claim 1, wherein the high density polyethylene has a melt flow rate (MFR) of about 0.1 to 1.2 g/10 min.

11. A coated fiber cement building article having a surface in contact with a multilayer film, wherein the multilayer film comprises:

an outer layer, said outer layer comprising a low density polyethylene (LDPE) and a high density polyethylene (HDPE);

an adhesive layer, said adhesive layer comprising ethylene methacrylate copolymer, ethylene acrylic acid copolymer, Maleic anhydride (MAH)—ethylene vinyl acetate (EVA), and at least one biocide, wherein the at least one biocide is in the form of a combination of both Zinc Pyrithione and Silver Phosphate, wherein the ratio of Zinc Pyrithione to Silver Phosphate is in the range of 1:3 to 3:1; and a core layer disposed between the outer layer and the adhesive layer, wherein the core layer comprises a linear low density polyethylene and a low density polyethylene.

12. The fiber cement article of claim 11, wherein the multilayer film covers 90% of the surface of the fiber cement article following lamination of the multilayer film to the surface of the coated fiber cement article.

13. The fiber cement article of claim 11, wherein the core layer and the adhesive layer further comprise a roughening agent comprising particulate $CaCO_3$ having a particle size of about 15 to 30 µm, wherein the roughening agent comprises inorganic particulates dispersed in a polyethylene resin mixture in a manner such that at least some of the inorganic particulates protrude from the core layer and the adhesive layer.

14. The fiber cement article of claim 11, wherein the relative thicknesses of the outer layer, the core layer, and the adhesive layer respectively are about 1:2:1 to about 3:15:2.

15. The fiber cement article of claim 11, wherein a surface of the coated fiber cement article is unglossed upon removal of the multilayer film.

16. The fiber cement article of claim 11, wherein the multilayer film has a secant modulus machine direction (MD) (1%) between about 17,000 and about 26,500 psi.

17. The fiber cement article of claim 11, wherein the multilayer film has an Elmendorf tear resistance MD between about 30 and 65.

18. The fiber cement article of claim 11, wherein the multilayer film has a bonding strength of about 10 to 100 g/inch to the coated fiber cement article.

19. A prefinished building article having a coated surface in contact with the protective packaging system of claim 1.

20. A protective packaging system for providing temporary protection of a top coating on a prefinished building article, comprising:

an outer layer, said outer layer comprising a low density polyethylene (LDPE) and a high density polyethylene (HDPE);

an adhesive layer, said adhesive layer comprising ethylene methacrylate copolymer, ethylene acrylic acid copolymer, Maleic anhydride (MAH)—ethylene vinyl acetate (EVA), and at least one biocide, wherein the at least one biocide comprises Zinc Pyrithione and Silver Phosphate; and a core layer disposed between the outer layer and the adhesive layer, wherein the core layer comprises a linear low density polyethylene and a low density polyethylene.

* * * * *